United States Patent [19]
Novey

[11] 4,416,221
[45] Nov. 22, 1983

[54] NIPPLE WATERER AND VALVE

[75] Inventor: Richard T. Novey, Turlock, Calif.

[73] Assignee: Alpha Poultry & Livestock Equip., Inc., Victorville, Calif.

[21] Appl. No.: 308,469

[22] Filed: Oct. 5, 1981

[51] Int. Cl.³ .............................................. A01K 7/06
[52] U.S. Cl. ..................................... 119/72.5; 119/75
[58] Field of Search .................. 119/72.5, 72, 75, 79; 251/349, 353, 354, 303, 118

[56] References Cited
U.S. PATENT DOCUMENTS

| | | | |
|---|---|---|---|
| 2,704,172 | 3/1955 | Lapin | 251/349 |
| 3,289,635 | 12/1966 | Eagles | 119/72.5 |
| 3,550,560 | 12/1970 | Edstrom | 119/72.5 |
| 3,868,926 | 3/1975 | Olde | 119/75 |
| 3,874,343 | 4/1975 | Niki | 119/72.5 |
| 4,329,941 | 5/1982 | Niki | 119/72.5 |

Primary Examiner—Robert Peshock
Assistant Examiner—Kris R. Schulze
Attorney, Agent, or Firm—William H. Maxwell

[57] ABSTRACT

A center flow animal waterer for coupled engagement to a pressured water supply and comprised of a valve-nipple-boot assembly retained within a body having a downstream flow restriction for limiting flow and having an upstream orifice restricting the supply of water to protect the boot which yieldingly supports the valve and nipple for angular displacement from a seat on the boot.

15 Claims, 4 Drawing Figures

NIPPLE WATERER AND VALVE

BACKGROUND

This invention relates to animal watering and in particular to a nipple type waterer and valve therefor, whereby a reliable shut-off is attained against water supplied under pressure and releasible by means of lateral movement through force exerted by the animal. This nipple waterer and valve is axially disposed in line with the axis of a tubing or piping terminous that delivers water to the animal. Accordingly, this device is an end fitting that is accessible to the animal, and the tip of which is in the form of a nipple adapted to be displaced laterally of its axis to open the valve, so long as it is displaced. The axis of disposition varies according to the requirements of the animal being watered.

This nipple type waterer is particularly adapted to the needs of domestic animals, hogs, rabbits, and mink and the like, which will drink from water supplied through mechanical devices. However, the use of this nipple is not to be restricted, as it has a wide range of utility, for example to use by paraplegics in drinking liquids. A feature is the center discharge through an angularly displaceable valve element carried by a flexible and elastic boot upon which it normally seats. Accordingly, it is a general object of this invention to provide a center discharging nipple which is natural in its delivery of water when nudged laterally by an animal desirous of quenching its thirst.

Animal waterers operated from water supplies ranging in pressure from a pound per square inch to a hundred pounds per square inch. Sealing in the "OFF" condition is imperative, and the volume of water released must be controllable by the natural instincts of the animal. To these ends a flexible boot of elastic rubber-like material is employed to support a nipple of durable plastic material. The nipple projects so as to be obviously accessible to the animal, while the boot is protectively enclosed. The valve element is rigid with the nipple and carried by the boot to be tipped radially in any direction, and it is these three parts together with the body which constitute the basic nipper waterer of the present invention. In this respect it is an object of this invention to provide a nipple and waterer valve that is practical and easily cleaned and which is sanitary.

It is also an object of this invention to restrict water flow as by means of orifice restriction; and to this end the valve element and nipple are restrictive to flow. However, the water supply is usually in excess of the restrictive flow and which would inflate and burst the elastic boot which mounts the valve element and nipple. Accordingly, it is an object of this invention to prevent bursting of the boot and this is by means of a corresponding orifice in the water supply. In practice, the orifice is provided in a retainer that secures the valve-nipple-boot assembly.

SUMMARY OF INVENTION

The nipple waterer herein disclosed is a center discharge device rigid with an angularly displaceable valve element carried by an elastic boot that presents a seat upon which the valve normally seals. The nipple-valve-boot assembly is received within a body supplied with water under pressure through a flow control and valve retainer that receives the aforesaid assembly and that prevents flow in excess of that which can be passed by the valve and nipple without rupturing the said boot. The flow control includes a strainer screen to eliminate debris that might otherwise cause malfunctions.

The foregoing and various other objects and features of this invention will be apparent and fully understood from the following detailed description of the typical preferred forms and applications thereof, throughout which description reference is made to the accompanying drawings.

PREFERRED EMBODIMENT

Figure 1:
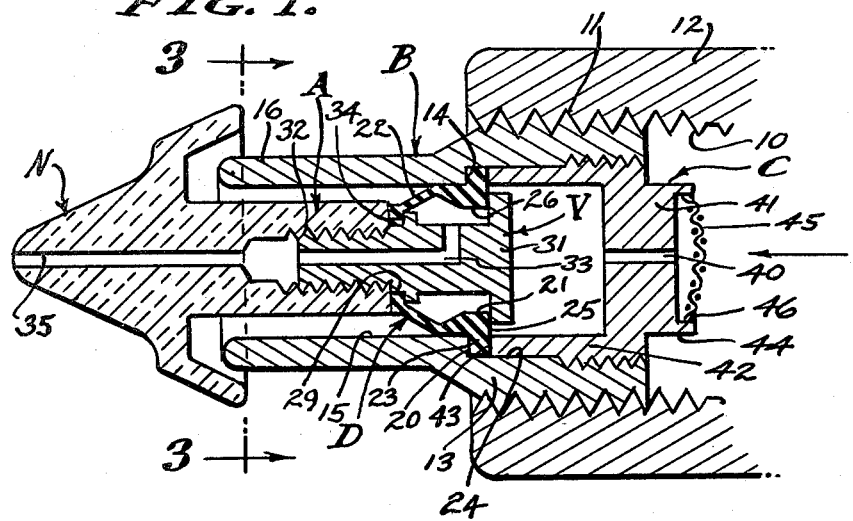
FIG. 1 is an enlarged longitudinal sectional view taken through the center flow animal waterer of the present invention, shown in a normal unactuated condition.

Referring now to the drawings, the Nipple Waterer and Valve of the present invention involves, generally, a body B that carries a valve-nipple-boot assembly A, said assembly being secured by a retainer-flow control C. The said valve-nipple-boot assembly A comprises a valve element V, a nipple N and a supporting boot D, an assembly that is easily replaceable in the body B and secured in working position by the retainer-flow control C. A feature is the one flexible and elastic part in the form of said boot D, all other parts being made of hard material such as metal or plastic. For example, the nipple N can be made of Nylon or Teflon as manufactured by DuPont, a tough plastic material that is resistant to cutting and abrasion, and yet soft to the mouth of the animal.

The body B is an elongated extension of a supply pipe P that brings water under pressure to the body. In practice the terminal end of the pipe (not shown) threaded at 10 and is coupled to the body B by exterior threads 11 thereon, said threads being connected by a pipe nipple 12 or the like. It is to be understood that the aforesaid coupling means can vary as circumstances require. Characteristically however, the body B is tubular so as to conduct or pass water therethrough to discharge from its open outer end from which the nipple N projects as will be described. A feature is the flange 13 that presents a shoulder 14 facing the inlet end of the body and upon which the boot D is positioned, the flange having a bore 15 which engageably passes the boot so that it projects forwardly. In practice, there is a body shell 16 that extends forwardly as a protector over the boot D and valve element V. The nipple N projects beyond the body shell 16.

The valve-nipple-boot assembly A is best illustrated in FIG. 1 of the drawings and comprises the valve element V, the nipple N and the boot D. It is the boot D that is secured by the retainer-flow control C, the boot D being made of an elastomeric material that is flexible and pliable, and thereby adapted to be deflected when the nipple is nudged laterally and angularly displaced from its normal axis. The boot D comprises a valve seat 20 that carries a forwardly extending barrel 21 from which a bellows 22 projects forwardly to carry the valve element V and nozzle N clamped thereto. The valve seat 20 is complementary to the flange 13 and presents a forwardly facing shoulder 23 engageable against the shoulder 14. The outer diameter of valve seat 20 slideably fits through the inner diameter 24 of body B and presents a planar valve seat 25 disposed normal to and concentric with the central axis. A cylindrical flow passage 26 extends forwardly through the boot D, with a substantial wall thickness within the outer cylinder diameter 27 thereof which slideably passes through the bore 15 in flange 13. Accordingly, the boot D is centered in the body B and held positioned by the shoulder 14 of flange 13.

The boot D is a flexible part as it extends forwardly from the valve seat 20 and cylindrical extension thereof which defines the flow passage 26. The said flexibility is established by providing the bellows 22 in the form of an inwardly convergent conical section of reduced wall thickness extending from the outer cylindrical diameter 27 to an anchor ring 29 that is inwardly disposed to support and carry the valve element V and nozzle N which are interengaged to clamp thereon. The boot D is characteristically a supple member that yieldingly supports the valve element and nozzle with the valve element normally engaged with the planar face of the seat 25, and being yieldingly flexible the valve element is releasable from the seat.

The valve element V is a centrally ported part having a stem 30 longitudinally coextensive with the boot D, between the face of seat 25 and the supporting anchor ring 29. Sealed engagement of the valve element V with the seat 25 is by means of an imperforate valve disc 31 that is integral with and projects radially from the stem 30 with a forwardly faced shoulder to engageably overly the seat 25. As shown, the valve element D has a reduced diameter 32 extending forwardly from the stem 30, there being a flow restricting port 33 extending therethrough and opening laterally intermediate the valve disc 31 and the anchor ring 29. There is a step or clamp face 34 at the joinder of the stem 30 and reduced diameter 32. There is also an annular space between the stem 30 and inner diameter of the forwardly extending barrel of the boot D. Accordingly, water under pressure released by tipping of the disc 31 from the seat 25, partially or completely removed, is free to flow into the annular space and through the restrictive port 33.

The nipple N can vary in form according to the animal to be watered, a typical center discharge nipple being shown throughout the drawings. The nipple N is an elongated tubular part coupled to the exterior of the reduced diameter 32 of the valve element, and it has a center discharge flow passage 35 in open communication with the flow restricting port 33. In practice, the nozzle N is threaded onto the extension 32 and presents a clamp face 36 to oppose the aforesaid clamp face 34, thereby to capture the anchor ring 29 therebetween. Accordingly, the valve element V and nipple N are rigid one with the other and with the supporting anchor ring 29 clamped between the faces 34 and 36. As shown, the nipple N is conically shaped with a divergent skirt 37 that overlies the forward open end of the body B, with clearance so that restricted lateral movement is permitted of said nipple.

The retainer-flow control C is provided to capture the valve-nipple-boot assembly A in its working position within the body B, and to condition the inlet flow of water. It will be observed that the restricting port 33 is downstream from the boot D, in which case high pressure of an unrestricted water supply under pressure can adversely affect the boot D by inflating the same. That is, accumulation of water in excess of that which can be sustained by the boot could build up by virtue of the said downstream restriction to flow. However, this adverse condition is obviated by the present invention through the provision of an upstream orifice 40 which is at least as restrictive as the downstream restricting port 33. In practice, the orifice 40 is in a wall 41 that blocks water flow, said wall being carried by a sleeve 42 that slideably enters the inner diameter 24 of the body B to engage the boot D. The flat end 43 of the sleeve clamps the perimeter valve seat 20 in working position, pressure therefor being applied by threaded engagement of the sleeve 42 in the body B and turned by a nut 44 in the form wrench flats surrounding the wall 41. A strainer screen 45 of cupped configuration is pressed into a counterbore 46 surrounding the orifice 40.

Figure 2:
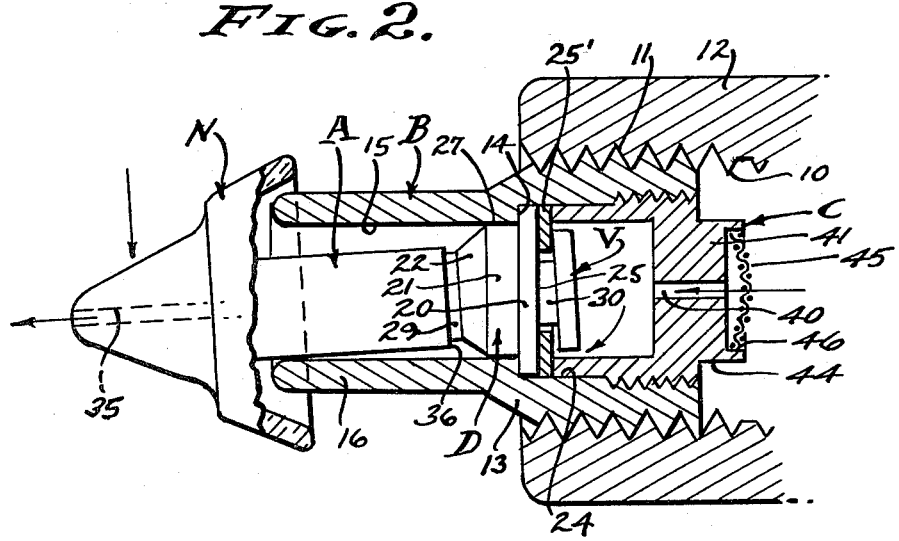
FIG. 2 is a sectional view similar to FIG. 1 showing the waterer in an actuated condition.
Figure 3:
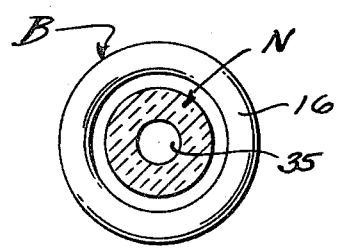
FIG. 3 is a sectional view taken as indicated by line 3—3 on FIG. 1.
Figure 4:
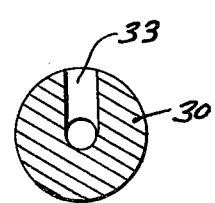
FIG. 4 is an enlarged sectional view taken through the valve element, removed from the assembly.

A modified valve seal 25' is shown in FIG. 2, comprised of hard material overlying the boot D and in the form of a washer that surrounds the imperforate disc-shapd valve element or disc 31. A hard faced valve seat is desired when controlling higher pressure water supplies.

From the foregoing, it will be seen that I have provided a center flow nipple type waterer wherein the valve element and nipple are captured in an assembly with a single yielding part in the form of a boot which functions as both the valve seat and valve-nipple-support. The boot is characteristically a supple element of elastic material that yields to lateral displacement of the nipple and valve through which downstream water is restricted. The valve element is displaceable radially in all directions. Since upstream pressure is expected to be variable and in excess of the boot capabilities, the protecting upstream orifice limits flow so that the boot cannot be inflated. Assembly and disassembly is an easy matter, simply by removal of the waterer from its mounting supply pipe coupling and by the removal of the retainer sleeve. Further, the valve-nipple-boot assembly is easily disassembled by revolving the nipple relative to the valve element, so that the ports may be cleaned and/or so that the boot can be replaced. The valve insert is also removeable for cleaning and/or replacement.

Having described only the typical and preferred forms and applications of my invention, I do not wish to be limited or restricted to the specific details herein set forth, but wish to reserve to myself any modifications or variations that may appear to those skilled in the art as set forth within the limits of the following claims.

I claim:

1. A center flow animal waterer comprised of a body and a valve-nipple-boot assembly;
   the body being an elongated tubular extension for a supply pipe of water under pressure and having a shoulder normal to a central axis and facing an inlet end of the body opening into the supply pipe with a retainer securing said valve-nipple-boot assembly to the said shoulder,
   the valve-nipple-boot assembly including, a boot of elastomeric material engageably positioned against the body shoulder and having a rearwardly faced valve seat and a forwardly extending barrel having a cylindrical flow passage therethrough and a flexible bellows extending from the barrel and radially inward to an anchor ring, a valve element having a stem with a clamp face engageable against a rearward side of the anchor ring and having an imperforate valve disc engageable against the rearwardly faced valve seat and having a port opening from an annulus between the stem and boot barrel and opening forwardly therethrough, and a nipple having a clamp face engageable against the forward side of the anchor ring and having a flow passage centrally therethrough and in open communication with the valve element port for water discharge, there being a coupling means securing the clamp faces of the valve element and nipple to the boot anchor ring, the nipple and valve element being rigid one with the other and carried by the elastic boot for angular displacement laterally of the said axis and tipped removal of the valve disc from the valve seat.

2. The center flow animal waterer as set forth in claim 1, wherein the boot has a forwardly facing shoulder disposed radially of the barrel to engage the body shoulder.

3. The center flow animal waterer as set forth in claim 1, wherein the imperforate valve disc extends radially of the valve element stem and has a forwardly facing shoulder to engage the rearwardly faced valve seat.

4. The center flow animal waterer as set forth in claim 1, wherein the anchor ring is disposed radially inward from the bellows for clamped engagement between the clamp faces of the valve element and nipple.

5. The center flow animal waterer as set forth in claim 1, wherein the bellows is of conical form extending forwardly and inwardly from the barrel to the anchor ring.

6. The center flow animal waterer as set forth in claim 1, wherein the bellows is of conical form extending forwardly and inwardly from the barrel to the anchor ring, and wherein the anchor ring is disposed radially inward from the inner forward end of the bellows for clamped engagement between the clamp faces of the valve element and nipple.

7. The center flow animal waterer as set forth in claim 1, wherein the coupling means is a threaded engagement between the valve element and the nipple.

8. The center flow waterer as set forth in claim 1, wherein the barrel of the boot is of substantial wall thickness backing the valve seat.

9. The center flow animal waterer as set forth in claim 1, wherein the barrel of the boot is of substantial wall thickness backing the valve seat and the bellows is of thin wall thickness to flex from the substantial wall thickness of said barrel.

10. The center flow animal waterer as set forth in claim 1, wherein the imperforate valve disc extends radially of the barrel of the boot and with a forwardly facing shoulder disposed radially of the barrel to engage the body shoulder, wherein the anchor ring is disposed radially inward from the bellows for clamped engagement between the clamp faces of the valve element and nipple, wherein the bellows is of conical form extending forwardly and inwardly from the barrel to the anchor ring, wherein the barrel of the boot is of substantial wall thickness backing the valve seat and the bellows is of thin wall thickness to flex from the substantial wall thickness of said barrel, and wherein the coupling means is a threaded engagement between the valve element and the nipple.

11. A center flow animal waterer comprised of a body and flow restricting restricting valve-nipple-boot assembly and a retainer-flow control;

the body being an elongated tubular extension for a supply pipe of water under pressure and having a shoulder normal to a central axis and facing an inlet end of the body opening into the supply pipe with a retainer-flow control securing said valve-nipple-boot assembly to the said shoulder, the valve-nipple-boot assembly including, a boot of elastomeric material engageably positioned against the body shoulder and having a rearwardly faced valve seat and a forwardly extending barrel having a cylindrical flow passage therethrough and a flexible bellows extending from the barrel and radially inward to an anchor ring, a valve element having a stem with a clamp face engageable against a rearward side of the anchor ring and having an imperforate valve disc engageable against the rearwardly faced valve seat and having a flow restricting port opening from an annulus between the stem and boot barrel and opening forwardly therethrough, and a nipple having a clamp face engageable against the forward side of the anchor ring and having a flow passage centrally therethrough and in open communication with the valve element port for water discharge, there being coupling means securing the clamp faces of the valve element and nipple to the boot anchor ring, and the retainer-flow control including a member upstream of the valve-nipple-boot assembly in the body and having a flow blocking wall with an orifice at least as restrictive as the flow restricting port through the valve element, the nipple and valve element being rigid one with the other and carried by the elastic boot for angular displacement laterally of the said axis and tipped removal of the valve disc from the valve seat.

12. The center flow controlled animal waterer as set forth in claim 11, wherein the retainer-flow control is a sleeve with a clamp face opposed to the body shoulder and with the perimeter of the valve seat clamped therebetween.

13. The center flow controlled animal waterer as set forth in claim 11, wherein the retainer-flow control is a sleeve threaded into the inlet end of the body and with a clamp face opposed to the body shoulder and with the perimeter of the valve seat clamped therebetween.

14. The center flow controlled animal waterer as set forth in claim 11, wherein the retainer-flow control is a sleeve carrying a filter screen upstream of said orifice.

15. The center flow controlled animal waterer as set forth in claim 11, wherein the retainer-flow control is a sleeve threaded into the inlet end of the body and with a clamp face opposed to the body shoulder and with the perimeter of the valve seat clamped therebetween, there being a filter screen carried by the sleeve upstream of the wall and restricting orifice therethrough.

* * * * *